Patented Feb. 13, 1951

2,541,505

UNITED STATES PATENT OFFICE 2,541,505

PRINTING INK CONTAINING ALKYD RESIN AND A MIXED HYDROCARBON SOLVENT

Joseph G. Curado, Bergen County, N. J., assignor to Sun Chemical Corporation, New York, N. Y., a corporation of Delaware No Drawing. Continuation of application Serial No. 346,801, July 22, 1940. This application March 19, 1946, Serial No. 655,593

3 Claims. (Cl. 260—33.6)

This invention relates to printing inks of the type characteristically containing a binder such as a resin or cellulose derivative, a solvent thereof, and an insoluble pigment; also to the preparation and utilization of such inks.

In most of the present-day commercial printing operations, the attainment of relatively high operating speeds is an important requirement. It has therefore been necessary to prepare and use printing inks which set with sufficient rapidity to prevent smearing, smudging or offsetting under present high-speed operating conditions. This is especially a problem where a considerable time element, compared to press speeds, would elapse before the ink sets sufficiently to prevent offsetting.

In high grade half-tone and multi-color printing, using so-called heat setting inks, for example, printing inks suitable for this purpose are now commonly made of resin, a vehicle or solvent for the resin, and an insoluble pigment, as the principal ingredients. The resin and solvent mixture is commonly referred to as the varnish. These inks acquire their initial set after printing by evaporation of the solvent or by penetration of both resin and solvent into the paper web, or by a combination of both. Final complete drying is attained, in either case, by evaporation, or removal from the imprinted ink of substantially all of the solvent, leaving more or less of the resin binding the pigment particles together and to the paper or other surface which has been printed.

When initial setting is brought about by penetration of the varnish into the paper, as in the usual newspaper inks and newspaper printing, for example, the pigment is relatively insecurely held, and smudges when lightly rubbed, even when dry. This is not a great disadvantage with some classes of printed products, but where greater durability and higher grades of printing are required, it is particularly undesirable.

When the setting of the ink is brought about by evaporation of the solvent, as for example with inks used in the printing of highly calendered or coated stock for books and magazines— i. e., so-called book paper, two difficulties are present. It is clear that the more volatile the solvent is, the more rapid will be the setting of the ink, other conditions being the same. However, a readily volatile solvent causes not only drying of the ink on the press, with obvious resulting difficulties, but also tends to cause a change in the physical characteristics of any of the ink which is exposed to the atmosphere prior to application, due to loss of solvent, and hence change in viscosity and other properties.

In recent years higher printing speeds were demanded by the publishers, particularly in the field of letter press magazine printing with a view to matching very high printing speeds long obtained in newspaper printing and more recently through the use of highly volatile solvent inks in intaglio printing. Because of the paper used in this magazine letter press field the required quality of work had caused the use of inks setting by evaporation or chemical action as opposed to very high speed setting through penetration as in newspaper work. To meet the demands for higher speeds in this field the press manufacturers promptly gave the required press speeds. It has long been known to use evaporators or driers in presses following the printing mechanism, to effect initial or final set of the printed ink, and at the same time that press speeds were increased evaporators or driers of increased heat input capacity were used in the presses. As a result solvents could be used whose volatility is such that there is no objectionable evaporation at the temperatures existing in the press room and at the ink fountains and printing mechanism; and by sufficiently increased heat application to the printed paper after it leaves the printing mechanism the temperatures may be raised sufficiently to cause rapid, or even substantially instantaneous, evaporation of the solvent. This heating may be sufficient to cause such set as will prevent smudging in subsequent handling and thus avoid the use of smudge or offset sheets, while giving high quality work at high press speeds. While various drier arrangements were tried the insistent demands of the printers for inks which would set almost instantaneously to permit extremely high press speeds in web perfecting presses for half-tone and multicolor reproductions rather promptly led to the adoption of greatly increased heat input, direct flame driers; and the most widely used drier for this type of work has become one using gas burners positioned closely adjacent the travelling web to impinge high temperature flames directly upon the printed surface of the paper. At the high speeds of web travel the localized high temperature flames will heat the ink on the paper almost instantaneously to evaporation without charring the paper itself. In some instances the burners are made with refractory parts which become incandescent and assist in the high heat input, and the solvents ordinarily available for such inks also are inflammable and the burning of the vaporized solvent may be beneficial and simplify the inherent problem of evacuating vapors and fumes from about the presses which might otherwise be objectionable or deleterious to the health of the operator. Practically all printing inks heretofore in use which rely essentially on solvent evaporation for setting represent a compromise between a high enough volatility to insure adequate speed of setting and a low enough volatility to insure stability of the ink on the press.

When reference is made herein to drying or setting to "non-offsetting condition," this term should be understood in its usual sense in the art herein referred to. It is, of course, clear that the conditions which effect an offset of any given impression may be mild or severe. For example, almost any impression even of good quality will offset even weeks or months after printing if subjected to sufficient pressure and rubbing action. However, under ordinary printing conditions, which are those referred to herein, a printed impression is considered to be non-offsetting if it will not offset onto paper or other surfaces with which it comes in contact during the usual operations subsequent to the printing operations, such as backing up, winding, folding, and stacking.

One object of the invention is to provide an ink having binder in solution or suspension in a composite vehicle which is of such character and in such proportion to the binder that minor changes in the ratio of a component of the vehicle with respect to the binder will cause setting of the ink to non-offsetting condition.

Still another object is to provide such an ink in which the vehicle comprises a component which is an inadequate solvent for the binder (such as a resin) and another component which is miscible with said non-solvent component and is an adequate solvent for the binder when in admixture with the non-solvent component and in which these components are so proportioned in admixture that even minor reduction in the amount of the solvent component will cause setting of the ink to non-offsetting condition.

Another object is to provide such an ink in which the binder is a resin or the like which is in such proportion to the predetermined solvent-non solvent miscible components that predetermined reduction in minor amount of the solvent component will cause gelation of the binder to non-offsetting condition.

Still another object of the present invention is to provide a printing ink of the resin-solvent-insoluble pigment type which can be set rapidly to non-smearing, non-offsetting condition; preferably, but not necessarily, with the aid of heat.

Another object is the preparation of such inks with the use of solvents which are relatively non-volatile at room and press temperatures.

Another object is to provide a printing ink which sets to non-smearing, non-offsetting condition without requiring the evaporation of a large proportion of the solvent in the ink.

A further object is to provide a printing ink which begins its initial set so rapidly that, even if placed in offsetting relation with another surface before it has set, it will smudge and smear less than hitherto available inks of this general type.

Also an object is to provide an ink comprising a binder and a solvent-non solvent vehicle in a system having a critical gelation point or balance, with the system approaching but short of the gelation point by a predetermined amount so that minor disturbance of the system by variation of such ratio, as by decrease of a minor fraction of the solvent component will cause such disturbance in the system that a gelation will occur.

Another object is to provide such an ink having such solvent-binder ratio that modification of the ratio of solvent to binder by an amount substantially equal to that which would occur in substantially one minute when the ink is imprinted on a coated book paper will cause the ink in the imprint to set to non-offsetting condition.

Still another object is to provide a printing ink which will set in the cold relatively quickly as compared with ordinary drying-oil inks, and even with other known volatile-solvent heat drying inks, thus permitting "cold" (room temperature) printing and drying, if desired—although the use of heat to promote the setting will ordinarily be practiced in carrying out the present invention.

Another object is to avoid excessive penetration of the resin into the printed surface, away from the pigment.

Other objects and advantages of the invention will be evident as the disclosure proceeds.

Inks prepared in accordance with the present invention are characterized by having such formulation that the vehicle has the requisite characteristics for giving proper printing operations and also has such ratio of solvent to binder that adequately substantial modification of the solvent-binder ratio will cause such increase in the viscosity of the imprinted ink that it will be set sufficiently to be non-offsetting when subjected to the normal operations as referred to above. This much desired result can be attained by so controlling the suspension balance of the ink system that it will have the desired characteristics for proper printing—such as tack, length, viscosity and press-stability, but the solvent-binder ratio is such that predetermined modification of that ratio will result, substantially instantaneously, in setting of the imprinted ink to a condition of such non-tacky rigidity, i. e., a condition of such high viscosity or approximate solidity as to be non-offsetting against the operating conditions referred to. That is, the ratio of solvent to binder is within such range that while the ink will handle quite satisfactorily in printing, the suspension balance of the ink system so approaches a critical solvent-binder ratio that substantially decreasing the relative amount of solvent to binder will cause the imprinted film to set, as a solid or near-solid or gel; so that it will withstand these operating effects of rollers, angle bars, folders and other instrumentalities in the press and also will be non-offsetting against ordinary handling pressures.

While printing inks of the general constituents to which this invention relates have been widely known and used for many years, so far as I am advised there has been no clear and definite understanding of the nature of these ink systems and all the factors which control the setting of the inks after printing. Many efforts, especially in more recent years, have been made to produce such inks having a solvent or liquid component which may be evaporated so as to leave the solvent freed binder and other constituents upon the paper, to speed up the printing operations. But I have found that with properly related constituents adequate setting may be caused by effecting a predetermined modification of the ink system balance, whether this is caused by evaporation or otherwise. In such systems the ink may be so formulated as to be of satisfactory viscosity, and other characteristics, for good printing and the solvent-binder ratio, for properly selected constituents, may be so close to a critical relationship that such substantial change in the system balance as will be caused in approximately not more than one minute when the ink is imprinted on coated book paper will cause such very large increase in viscosity that the imprinted ink will set to a state which equals that of a solid or near-solid, or gel.

While the type of critical viscosity range ink system is not fully understood in all its aspects, the astonishing results from use thereof may readily be seen and appraised.

This is true, whatever may be the entirely correct underlying theory. In my application Serial No. 346,801 filed July 22, 1940, now abandoned, of which this present application is a continuation this phenomenon was explained in terms of preparation of a varnish in which the solvent-non solvent components are in such proportion that the solution or suspension of the binder such as a resin chosen with respect to the vehicle, is almost at the point of precipitation upon the paper, the solvent being diluted almost to gelation with the non-solvent—i. e., to a predetermined state of incipient gelation. Such a system may be made so close to the point of gelation, which would be a non-workably high viscosity, that a very small decrease of the controlling ratio—for example, a variation in the amount of solvent in the system—will result in throwing the resin out of solution into a gel. This may be accomplished in practical operations by adsorbing part of the solvent into the paper or its coating, and the ratio of the several components of the system may be so regulated that the ink gels or solidifies upon contact with the paper or like surface which is printed with it. Or, by selecting a solvent which is of lower boiling range than the non-solvent diluent a minor loss of solvent through evaporation, as by a suitable drying means, brings about an equally rapid gelling. By proper selection of materials such systems can be made so critical that printing is impossible due to the disturbing of the critical balance during impression so that gelling occurs before plate and paper separate. Thus extreme nicety of control may be effected. The terms "solvent" and "non-solvent" herein are used for convenience to distinguish respectively a relatively good solvent for the binder, such for example as thermoplastic solid or semi-solid resin or modified resin material ordinarily used in heat set inks, and an inadequate solvent for such binder, which latter may be so inadequate with respect to some particular resinous or binder material as to be substantially a non-solvent therefor. I am not certain that this theory is correct insofar as it refers to the formation of a gel—as that term, strictly speaking, may not properly apply to the very high viscosity set ink impressions referred to. The set ink is of such greatly increased viscosity that, as stated, it appears to be a solid or near-solid or like a true gel; but whether it is a true gel or not, there is a critical range in the system balance such that a ratio of binder to solvent in excess of the upper limit of such range, for the solvents and resinous binders possessing these related characteristics, will cause said great increase in viscosity to non-offsetting solidity regardless of whether it be a gel forming phenomenon or not. But, as these ink systems will set even without evaporation of all the solvent, as heretofore considered necessary, and with quite substantial quantities of the solvent in the set ink it appears clear that the practicing of the invention does not involve the necessity of forming a true gel, but that changing of the solvent to binder ratio to reduce the relative amount of solvent will cause the setting and this permits of making ink systems in which the solvent-binder ratio may be so close to the critical value that setting may be secured by removal of only a fraction of the solvent.

Whatever the theory, the gel or set ink as so formed will set or dry with or without added heat. Thus, when printed on paper in the usual manner, the inks of the present invention will ordinarily dry to non-offsetting condition in less than one minute, at press or room temperature. The usual inks now available require much longer to dry equally under like conditions. On the other hand, if the printed impression made with inks of the present invention is subjected to added heat—e. g., to a temperature of about 200° C., which is used in common practice in drying inks—the imprinted ink loses solvent, and hardens to dry, non-offsetting condition more quickly than without the added heat. The difference in speed of setting with and without added heat is much more marked, however, when printing upon completely non-absorbent materials, such as glassine, or metal foil. In such circumstances, the ink of the present invention dries so slowly at ordinary press temperatures or below that added heat—e. g. a temperature of 200° C.— is required to effect rapid drying.

This invention permits of providing inks peculiarly adaptable and valuable for high speed printing and an ink of such high speed that substantially instantaneous setting may be attained. With the varnish of the ink in such state of potential or incipient gelation or setting, the ink sets when the component ratio is varied beyond the critical solvent-binder ratio, as when brought into contact with paper or any like more or less absorbent or adsorbent surface which causes disturbance beyond the critical point.

When the system is one having a resinous material which is adequately soluble in a liquid consisting of a good solvent and a poor solvent for the resin, then if the system is disturbed by removal of a minor but sufficient fraction of the solvent component, as by evaporation, so that the critical gelation or non-solution point is passed, the ink will set. When this disturbance of the system occurs the formation of a substantially solid material will start and proceed very rapidly, even substantially instantaneously. When the critical point in the system balance of this invention is passed and the ink is first set, it is at first somewhat soft and wet, but its viscosity is nevertheless so high as to equal that of a solid or gel, it goes quickly to such high viscosity and is a "near-solid" despite the solvent remaining therein. It dries, in the absence of added heat, by an action which may be somewhat analogous to syneresis—that is, by exudation of some of the solvent as a result of contraction of the gel structure—and the solvent which thus separates is largely absorbed by the paper, whence it passes off by evaporation; although some of the solvent presumably evaporates directly into the air from the printed impression. The amount which evaporates in the latter manner depends to some extent upon the ambient temperature. When heat is supplied, as is done in conventional heat-drying processes for setting inks, there is considerable evaporation of the solvent, following which the gel or resinous material sets to non-offsetting solid condition due to cooling together with evaporation of solvent. This also explains why drying of inks of the present invention without added heat on non-absorbent surfaces such as glassine and metal foil is so slow—the solvent which separates can not be taken up by the surface, to evaporate later, and therefore remains in the impression, whence it evaporates very slowly at ordinary or press temperatures due to its low volatility.

Very satisfactory results are secured in producing inks according to this invention by using resins and composite solvents such as the solvent-non solvent mixtures, chosen with proper respect to each other to give such potential gelation systems as described. In preparing the varnish the resin and solvent are heated together sufficiently to melt the resin and thereby to effect proper solution and homogeneity. When resins and solvent are heated together in this way, and then cooled, products of various characteristics may be obtained. Thus, if the solvent is an adequately good solvent for the resin, the cooled solution is stable. This is true whatever the constituents of the solvent material, some being much better solvents for certain resins than others. If the solvent-binder relationship is such that at the proper viscosity for printing the ratio of solvent to binder is within the critical range referred to, then modifying the system balance as by removal of a substantial amount of the solvent, to be outside the normal working or printing range will give such remarkable and large increase in viscosity as stated and the printed impression will set, or gel or solidify to the non-offsetting condition desired and described. It is to be understood, therefore, that whatever the theory, where a gel, or set, or solid or near-solid condition is referred to herein, it refers to the setting which occurs as a result of such system balance modification.

Such solutions or suspensions of the resins usually available for commercial use in inks, are in fact ordinarily colloidal solutions or suspensions. The particle size of the suspension seems to vary with the solvents and resins used and seemingly when poorer solvents, i. e. solvents of relatively low dispersing power, or more difficulty dispersible resins, or both, are used, the particle size of the resin in the varnish is larger, and the varnish becomes a colloidal suspension of relatively large particles. However that may be, by properly controlling the solvent and resin with respect to each other, and properly limiting the excess of solvent over that which represents the critical solution, or gelation, point for the solvent and resin chosen a condition may be obtained where the solution is so close to the critical gelation point that variations in ratio which, practically, are so small as to be easily attainable in commercial operations, may cause gelation or setting to occur. Whether the particles separate as individual particles or grouped together in aggregates, is immaterial. Individual particles or an aggregate of particles are treated as a "particle," since they are effective essentially as one particle rather than as the individual components. To meet only the requirements with respect to ratio of solvent to resin is not enough, however, as the combined properties of the system as varnish must be considered. Thus, a solvent may be satisfactory when used with some resins, but not with others.

The solvent should meet the following requirements, with respect to volatility, boiling range, and solvent power: It should be a relatively non-volatile fluid at normal temperatures encountered in the press room and in the fountain and printing unit, much less volatile than solvents heretofore commonly used. For example, I prefer to use a solvent which, when spread on filter paper in an amount of 400 mgm. on a 9 mm. circle will lose not more than about 5% by weight in 20 hours' standing at 25° C. in open, still air. Under like conditions, diethylene glycol monobutyl ether, a typical solvent already known in the art, loses over 30%. The initial boiling point should be high, and the boiling range should be narrow so that clean evaporation can take place. Finally the liquid solvent used, such as the solvent-non solvent mixture referred to as particularly satisfactory should have the property of providing a critical narrow range or point so that by properly proportioning the solvent and non-solvent to each other and to the resin the desired approach to the gelation balance of the system may be attained. The desired balance of such a system may be attained by mixing the solvent and non-solvent in the proportions required, or by selecting a commercial material available or prepared to have the desired solvent-non solvent ratio, or the desired solvent action with respect to the selected binder—i. e, to give the requisite printing characteristics and the critical range system balance. For example, resins commercially available at practicable prices are the alkyd and modified alkyds which are substantially insoluble in paraffin hydrocarbons. Such resins however are soluble in aromatics such as toluol, and these compounds within the range from toluol to benzyl benzoate (boiling points varying roughly from about 110° to 350° C.) may be used satisfactorily as the solvent portion of the system with a paraffin hydrocarbon such as kerosene as the non-solvent miscible component. Furthermore certain other compounds, such as some of the components (other than the paraffin hydrocarbons) which are found in commercial kerosenes are good solvents for various of the resins used in the ink industry, and admixtures of these compounds, such as aromatics, of proper boiling range and in proper ratio with lesser solvents for the tenacious resinous binders, such as the paraffin hydrocarbons, for use with resins such as alkyd and modified alkyd resins as referred to above, will provide a satisfactory varnish system.

The solvent-non solvent ratio and the proportion of solvent required may be readily determined in the following manner—the resin is dissolved in the solvent and non-solvent is then added until slight precipitation occurs at which point sufficient solvent is added to redissolve the precipitate and the relative proportions and ratio of the system thus determined. For example, the resin might be dissolved in toluol and a paraffin hydrocarbon such as kerosene substantially free from good solvent added to produce the precipitation and just enough toluol then added to redissolve and the component constituency then determined. But many available petroleum fractions are adequate solvents for resinous materials used as binder components in inks, the relative solvent characteristics of these commercially available materials varying rather widely, however. By means of this invention ink systems having the critical setting range may be formulated readily, as it permits of determining the relative solvent-binder characteristics and by simple admixture and test permits of determining whether any such admixture of components is sufficiently close to the critical setting point while also of proper printing characteristics.

As an example a satisfactory ink of this invention may be made by making a varnish consisting of

| | Parts |
|---|---|
| Resin | 54.5 |
| Rosin oil | 43.0 |
| Diamyl benzene | 2.5 |
| | 100.0 |

Some resins on the market are satisfactory for use in making the inks of this invention and others are not. Resin manufacturers do not often disclose the precise character or method of manufacture of their products and therefore the suitability of the resin must be determined by actual test, or experience; or by testing the resin and if it is found too soluble or not to provide the range of solvent-binder ratio or balance in the system with the solvent component desired to be used then by modifying it and its characteristics, as by extending it as with linseed oil to give the desired solubility and solution balance for the chosen solvent. The extending or modifying treatment will depend on the resin and the characteristics given to it when synthetically made by its manufacturer, but ordinarily for available and desirable mixtures such as the solvent-nonsolvent referred to such synthetic resins as modified maleic acid-glycerol alkyds will usually be heated with a drying oil, such as linseed oil, for periods varying from twenty minutes to three hours in proper proportion. For example in the varnish referred to above the resin is an extended one prepared by heating 55 parts of a rosin modified maleic-glycerol alkyd resin with 45 parts alkali refined grade linseed oil at 580° F. for one hundred minutes, and then blended with good solvent (diamyl-benzene) and the poorer solvent at about 400° F. The poorer or non-solvent component in such example is an olefine and terpene-free rosin oil (the ordinary commercial rosin oil may have included such constituents as to have too high solvent power for this resin). This procedure of extending resins with drying oils permits accurate critical control of resin solubility and tolerance in the system for the poorer or non-solvent component. Generally speaking the longer the resin is cooked in the drying oil the less soluble it becomes; but too much bodying in this manner produces an extended resin which will mottle in printing or will liver.

With such a varnish a satisfactory ink may be made by grinding in the pigment to the following formula,

| | Per cent |
|---|---|
| Varnish | 72.0 |
| Carbon black | 17.0 |
| Blue toner | 6.5 |
| Milori blue pigment | 4.0 |
| Drier | 0.5 |
| | 100.0 |

In practice it has been found that a solvent such as the solvent-non-solvent mixture above described meets the foregoing requirements, and that very satisfactory operating results are obtained when such solvent has an initial boiling point of approximately 250° C. Furthermore especially satisfactory operating results have been attained when the solvent components have such boiling ranges that substantially all the oil boils within approximately a range of 10° C., or, at most, 15° C. In determining the boiling range of high boiling oils, the temperatures obtained depend to a considerable extent on the exact method of distillation. In the present process, the stated boiling ranges were obtained by using an 80 cc. sample of the oil in a 100 cc. standard Engler flask. The temperature was measured by a thermocouple in the vapor instead of a thermometer, in order to avoid any temperature corrections. The rate of distillation was the same as in the ordinary Engler. The apparatus, excepting the thermocouple, was the same as that of the standard Engler.

It has been found also that a very satisfactory composite vehicle is obtainable commercially from Pennsylvania base oils refined to give a fraction having a boiling range of 301–311° C., determined as above described. Such fraction has approximately 10% of non-paraffin compounds (understood to be aromatics) which have adequate solvent power for alkyd, modified alkyd, phenolic, etc. resins readily available from various manufacturers, and this commercially produced admixture, as hereinafter described, has produced highly satisfactory commercial inks of this invention.

Properties required in the resin have been indicated above in describing the solvent. By such determination it has been found that the Pennsylvania base 301°–311° C. boiling range kerosene fraction above referred to gives a thoroughly satisfactory commercial ink which sets by separation of the binder almost instantaneously where the solvent to binder ratio is decreased below a critical proportion. Such material is obtainable at commercially practicable prices, and also has its components boiling within such a narrow range and at a temperature sufficiently low so that with the gas flame driers now used it readily evaporates within the time allowed by present day high speed web perfecting presses and has good solvent release to give non-offsetting and fine printing effects. Resin mixtures may often be used to advantage, in place of single resins.

Another satisfactory varnish may be made by using ethyl cellulose, for example

| | Per cent |
|---|---|
| Ethyl cellulose | 14.0 |
| Benzyl alcohol | 19.2 |
| Dimethyl phthalate | 22.0 |
| Mono amyl naphthalene | 16.4 |
| Benzyl benzoate | 12.0 |
| 301–311° mineral oil | 16.4 |
| | 100.0 |

With this varnish a satisfactory ink is

| | |
|---|---|
| Varnish | 73.2 |
| Carbon black | 16.3 |
| Milori blue | 10.5 |
| | 100.0 |

Alternatively, if desired, a satisfactory resin may be prepared in accordance with the following procedure, wherein the parts are by weight:

Into a suitable container provided with a water condenser and a stirrer, introduce 300 parts tertiary butyl phenol and also 36 parts sodium hydroxide dissolved in 353 parts water. While stirring, add 315 parts of a 38% solution of formalin, and bring the temperature of the mixture to between 50 and 55° C. This temperature is maintained for about 20–22 hours, during the first six hours or so of which the stirring is continued. During this treatment the contents of the container assume a golden red color. The caustic, which is used as a catalyst, is then neutralized by adding 95 parts of 35% HCl dissolved in 500 parts water. The whole mixture is agitated and allowed to settle; the lower layer, which is a sticky viscous liquid having a pale yellow color, is the phenolic-aldehyde condensate. This latter is drawn off and washed with water. After separation from the water, the yield of the condensate is about 450 parts. This condensate is then reacted with modifying agents in the following manner: 702 parts ester gum, 123 parts WW rosin, and 6 parts of lime-modified rosin, are uniformly melted together and heated to 100° C. in an open container. To this mixture at 100° C. is added 170 parts of the phenolic-aldehyde resin prepared as just described, gradually and with stirring. The temperature is raised slowly and by regular intervals, with some stirring, until after 6 hours elapses a temperature of 250° C. is reached. The reaction is then stopped, and the product is cooled and ready for use. The yield is about 850 parts.

The resin so prepared will be referred to herein as resin R, and has such characteristics that when admixed with solvent, as herein set out, it will give an ink component having a system falling within the solvent-binder range specified and having those characteristics which provide the superior inks of this invention.

A satisfactory varnish for use in accordance with the present invention may be prepared by mixing 40–45 parts of such resin R and 60–55 parts of the 301–311 mineral oil (parts being by weight), in the presence of heat as described hereinafter. A varnish which is even better with respect to printing qualities may be prepared by incorporation of a small amount of ester gum, for example, in the proportions by weight of 33.3 parts resin R, 16.7 parts ester gum, and 50 parts of the 301–311 mineral oil.

Other properties of both solvent and resin can be best set forth by a description of the properties of the varnish.

Referring, for example to the varnish comprising the 301–311° mineral oil, the varnish of the present invention has the property when standing in bulk, at room temperature, that the varnish remains free of gel or solid for at least 24 hours—except that some varnishes close to the critical setting or gelation point may exhibit a purely superficial skin or pellicle of gel on surfaces exposed to the air or the container.

Also the viscosity of such varnish is relatively high. The desired viscosity for use in the present invention may be obtained by proper admixing solvents and resins having the proper characteristics relative to each other. As the viscosity varies with the temperature and the temperature may vary materially because of room temperature variations, and also because the temperature of the ink in the fountain especially in high speed presses, increases very materially over the first few hours of operation the viscosities at these temperatures encountered are important considerations. In commercial inks of this invention using the 301–311° C. petroleum fraction satisfactory varnishes have been made, as follows,

*Varnish A.*—Equal parts resin R and 301–311 mineral oil.

*Varnish B.*—Equal parts Dammar gum and 301–311 mineral oil.

| Varnish | Viscosity in centipoises at— | | |
|---|---|---|---|
| | 27° C. | 50° C. | 100° C. |
| A | 20,650 | 784 | 32 |
| B | 2,764 | 296 | 19 |

Varnish A is just below the critical gelation or setting point at 27° C.; however, if the percent of solvent is slightly increased, to not over 60%, the viscosity drops sharply to the general range of that of varnish B. For most printing purposes, the viscosity of varnish A at 27° C. is too high, and it is preferable to increase the amount of solvent to bring the viscosity down to the general range of that of varnish B. Of if desired, the viscosity can be reduced by maintaining the varnish and the resulting ink at temperatures somewhat above 27° C.—e. g. at about 35° C. For most operations the viscosity of the varnish and the resulting ink should be between about 1100 and 6000 centipoises at 27° C., although higher viscosities may be suitable in some instances. Varnishes having viscosities below 1100 centipoises at 27° C. are to be avoided, however, as being too thin for suitable general use. In the commercial inks referred to the preferred varnishes specified above should, when composed of equal parts by weight of solvent and resin, have viscosities at least equal to that shown for varnishes composed of equal parts of Dammar gum and 301–311 mineral oil—i. e. at least equal to about 2750 centipoises at 27° C. and under such characteristics will give unusual results of quick setting, fine printing and drying into fine quality printed product.

Inasmuch as slight changes in the procedure for preparing the resin, or of incorporating the resin with the solvent (as well as changes in resin-to-solvent ratio, and in temperature) affect the viscosity, it is evident that exact duplication of the results shown is not necessarily always possible, but that nevertheless these are fairly representative of varnishes of the types to which each pertains. And, as stated above, by using resin R and a solvent component having the characteristics of the 301–311° C. material as described a vehicle is obtained which serves admirably as a yardstick by which to measure other resinous-solvent systems and also the completed inks made from a vehicle of this invention within the critical solvent-binder ratio and having the viscosity, and other desirable ink characteristics, which make for good printing and also having the system balance sufficiently close to the critical value so that the quick setting will occur upon modification of that balance as described.

It is evident from the above, and from trial in operation, that the illustrative varnishes of the present invention are very much nearer to the critical gel state than are common prior art varnishes. Also it is evident that a new and novel criterion for the coordinated selection of a commercially available admixture of the so-called "solvent-non solvent," or other available solvent component, and suitable resin therefor is provided. Certain Texas base petroleum fractions, for example, if prepared to have the same 301°–311° C. boiling range would nevertheless act quite differently from the Pennsylvania base fraction described above and would require quite different processing and treatment to secure the inks and the results attainable with this invention. For such Texas base fraction has a much larger ratio of solvent to non-solvent and therefore is not comparable to a solvent exemplified by the 301–311° C. referred to above and would not produce the system balance, or condition of potential or incipient gelation to be near the critical setting or gelation balance above described. But by the method of determination above described the critical system balance or setting point and the required solvent-binder ratio and the utility of the fraction for the practicing of the present invention may be readily determined.

The above will serve to illustrate some of the points already discussed with respect to the fact that inks made in accordance with the present invention, in spite of their relatively low volatility, upon modification of the system balance will change over so rapidly from the commercially good printing viscosity to such greatly increased viscosity as to set to such a solid or near-solid or gel condition that they will be non-offsetting, even though substantial quantity of the solvent component remains in the imprinted ink. Referring to the illustrative varnish A described above, the small described increase in the solvent to binder ratio thereof will decrease the viscosity from just short of setting to about 2750 centipoises at 27° C. It is thus evident that a corresponding decrease in solvent to binder ratio of the imprinted ink, as by withdrawal into the paper, will cause an equally sharp increase in viscosity from said satisfactory printable viscosity to a viscosity so high that the imprinted ink will set into the very high viscosity which attends the solid or near-solid or gel condition. This same decrease may readily be caused by evaporating a part of the solvent, substantially instantaneously, in the heat setting printing processes referred to and as some solvent also will penetrate into the paper, the ink will set to the non-offsetting very high viscosity condition instantaneously, or substantially instantaneously. Such inks have the suitable and desirable viscosity characteristics for good printing, and also have the characteristics of the solvent and binder with respect to each other that with such printable viscosity the system balance is such that varying the solvent-binder ratio as described will cause the system to pass the critical ratio above which the viscosity increases so sharply that the ink changes from the comparatively low printing viscosity, to such a greatly and sharply increased viscosity that the ink acts, or sets, as a solid or near-solid or gel condition. Other solvent and binder constituents may be admixed having the same order of viscosity characteristics in the same solvent-ratio range to give the desired printing and also, after printing, to give like great increase to the viscosity of a solid, or near-solid or gel by like decrease in the solvent to binder ratio. It has been found that when such binder-solvent inks are made so that there is a sufficiently sharp increase in viscosity with increase in ratio of binder to solvent they will set with extreme rapidity to the very high viscosity non-offsetting condition described. And by means of this invention such inks may be made up of materials so selected that within the easily attained solvent-binder range of ratios referred to the desired high quality printing may be effected and the rapid setting then caused. Two inks may be formulated of differing materials such that both have the same good printing viscosity and yet the system balances may be so widely different that one will have the desired quick-setting and the other will be still of such low viscosity after it passes through the heat driers that it will be insufficiently set and fluent and tacky and therefore unsatisfactory. For example, two tests were made on commercial black inks both for use in high speed, heat set, letter press printing of an illustrated magazine. One of them was made of solvent and binder materials having such relative qualities as to give the system balance and solvent-binder ratios within the range of this invention and the other outside thereof. The first upon removal of solvent to bring the binder content to about 80% had its viscosity increased to about $2.5 \times 10^5$ poises, while upon removal of the same amount of solvent from the other the viscosity was found to be $9.5 \times 10^5$ poises and was found insufficiently dry to be satisfactory while the former set to the desired solid, near-solid or gel condition. This decrease in ratio of solvent to binder is about that which occurs with solvents of the character herein referred to while passing through heat drying equipment now commercially used on letter press magazine printing, and approximates in result that slight decrease in solvent from the ratio of 50% solvent to 50% binder described above which is caused in approximately one minute at a temperature of 27° C. by imprinting the ink on a coated book paper. As will be evident the increased setting viscosity of the ink of this invention is tremendously greater than with the ink which was formulated to be outside the solvent-binder ratio range of the invention.

It is clear that inks typical of the present invention are much less volatile at any given temperature than are the usual prior art inks, represented by the other illustration. While the varnishes of the present invention at press temperatures (about 50° C.) and above are fluid enough to be used in ordinary high speed printing operations without difficulty; yet a relatively slight drop in temperature of even a few degrees centigrade causes imprinted films to become exceedingly viscous.

In preparing varnishes in accordance with the present invention, I mix together the resin or resins and the solvent both selected in accordance with the requirements already set forth, at a temperature of say 250°–290° C., until the mixture is homogeneous. This temperature should be above the melting point of the resin and below the boiling point of the solvent. After the resulting varnish has cooled, pigments are added as desired and the mixture is intimately ground in a conventional ink mill or other apparatus. The amount of solvent used is generally equal to or slightly more than the amount of resin, by weight.

Several suitable resins and mixtures of resins have already been referred to herein, including resin R, a mixture of resin R and ester gum. Dammar gum may be used, but this gives a varnish which is about on the borderline of satisfactory working conditions. It will be noted that while the viscosity of a varnish made from equal parts Dammar gum and the 301–311° C. mineral oil is within the preferred range nevertheless such a varnish is insufficiently near the point of incipient gelation at about 27° C. to be suitable in this present invention as are varnishes such as those represented by the satisfactory examples above. A Dammer gum varnish can, however, be improved by the addition of a small proportion of rosin. Other natural or synthetic resins, and mixtures of them, may also be used, including mixtures of ester gum and phenolated copal resins, and mixtures of rosin with cumar or alkyd resins.

Pigments are ground into the varnish just described in the same manner and in approximately the same proportions as in the ordinary printing ink practice.

After the ink is thus prepared, it is used in printing in the usual manner. Inasmuch as this ink is relatively non-volatile, the precautions now frequently necessary to prevent volatilization and resultant setting or caking of ink on the printing press mechanisms, and other disadvantages which result from upsetting of the solvent-to-resin (or the varnish) ratio, need not be observed.

Conventional drying procedure, wherein the printed impression is subjected to a temperature sufficient to melt the resin (e. g. 200° C.) is advantageous, but not always necessary.

It should be observed that the ink of the present invention does not require additional agents such as plasticizers and other special materials commonly added in inks hitherto available. For example, high boiling solvents or plasticizers such as dialkyl phthalates, tricresyl phosphate, and blown or heat bodied oils such as castor, linseed, and tung have been incorporated with resins and solvents for the resin in preparing varnishes. One of the principal reasons for these additions has been to assist in retaining fluidity of the inks after the almost inevitable loss of some of the relatively volatile solvent prior to making the printed impression. In the preferred practice of the invention, the use of these addition agents is unnecessary. It is thought this may be due to the retention of some solvent in the set ink after the drying operation is completed, which solvent is thought to be in sufficient amount to prevent undue brittleness of the printed ink film even though the extremely sudden and sharp increase in viscosity has caused the ink to set to a viscosity condition practically approximating a solid or gel. It should be noted that while the 301–311° C fraction referred to herein has been used in large scale commercial operations in the inks of this invention, it is not an essential constituent as other solvent components may be used so long as they are of such character as to be press stable, to give a good printable ink, and to give a system balance such that the great viscosity change will occur upon the modification of the system balance.

While the foregoing disclosure describes in detail the preferred embodiment of this invention and some modifications thereof, it will be understood that this disclosure is for the purpose of illustration only and that various changes may be made without departing from the spirit and scope of the invention as set forth in the appended claims.

What is claimed is:

1. A printing ink comprising as essential ingredients an organic liquid carrier which is substantially non-volatile at normal press room temperatures, a linseed-oil-extended rosin-modified maleic glycerol alkyd resinous binder and a pigment, said liquid carrier consisting of a mixture of a paraffin hydrocarbon liquid which is a non-solvent for said resinous binder together with an aromatic hydrocarbon liquid which is at least as volatile as said paraffin hydrocarbon liquid, is miscible with said paraffin hydrocarbon liquid and which is itself a solvent for said resinous binder, the amount of said liquid carrier being within the range of 50–60 per cent of the total of said liquid carrier plus said resinous binder and the amount of said aromatic hydrocarbon being sufficient to maintain said resinous binder in solution and to provide a resinous binder-liquid carrier varnish having a viscosity within the range of 1100–6000 centipoises at 27° C., said paraffin hydrocarbon liquid comprising at least the major proportion of said liquid carrier.

2. A printing ink comprising as essential ingredients an organic liquid carrier, a linseed oil-extended rosin-modified maleic glycerol alkyd resinous binder and a pigment, said liquid carrier consisting of a mixture of paraffin hydrocarbon liquid which distills within the range of 301–311° C., and which is a non-solvent for said resinous binder together with an aromatic hydrocarbon liquid which distills within the range of 301–311° C., which is miscible with said paraffin hydrocarbon liquid and which is itself a solvent for said resinous binder, the amount of said liquid carrier being within the range of 50–60 per cent of the total of said liquid carrier plus said resinous binder and the amount of said aromatic hydrocarbon liquid being sufficient to maintain said resinous binder in solution and to provide a liquid carrier resinous binder varnish having a viscosity within the range of 1100–6000 centipoises at 27° C., said paraffin hydrocarbon liquid comprising at least the major proportion of said liquid carrier.

3. A printing ink comprising as essential ingredients an organic liquid carrier, a linseed oil-extended rosin-modified maleic glycerol alkyd resinous binder and a pigment, said liquid carrier consisting of a mixture of paraffin hydrocarbon liquid which distills within the range of 301–311° C., and which is a non-solvent for the resinous binder, together with an aromatic hydrocarbon liquid which distills within the range of 301–311° C., is miscible with said paraffin hydrocarbon liquid and which is itself a solvent for said resinous binder, the amount of said liquid carrier being within the range of 50–60% of the total of said liquid carrier plus said resinous binder, and the amount of said aromatic hydrocarbon being approximately 10% of said liquid carier, the liquid carrier plus resinous binder providing a varnish having a viscosity within the range of approximately 1100–6000 centipoises at 27° C.

JOSEPH G. CURADO.

REFERENCES CITED

The following references are of record in the file of this patent:

UNITED STATES PATENTS

| Number | Name | Date |
|---|---|---|
| 1,439,696 | Doughty | Dec. 26, 1922 |
| 2,162,331 | Ellis | June 13, 1939 |
| 2,254,072 | Jenkins | Aug. 26, 1941 |
| 2,393,637 | Jones et al. | Jan. 29, 1946 |
| 2,436,791 | Cray | Mar. 2, 1948 |

FOREIGN PATENTS

| Number | Country | Date |
|---|---|---|
| 468,384 | Great Britain | July 2, 1937 |

OTHER REFERENCES

Industrial and Engineering Chemistry, vol. 35, No. 10, October 1943, page 1044.